(No Model.)
W. W. SMALLEY.
JOURNAL BEARING.
No. 398,547. Patented Feb. 26, 1889.
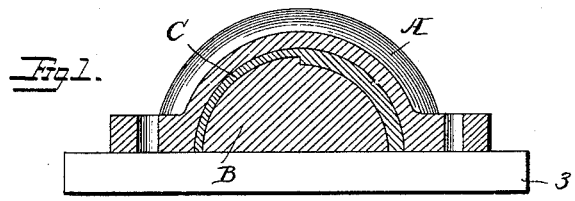
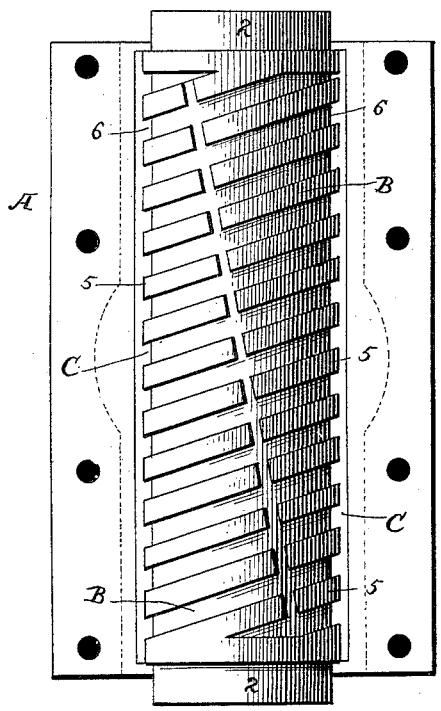
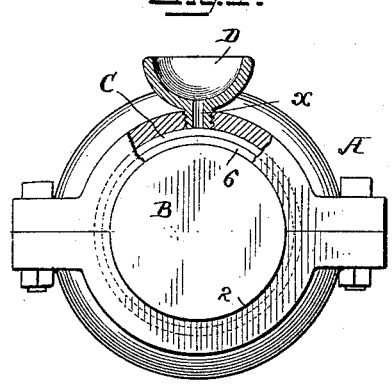
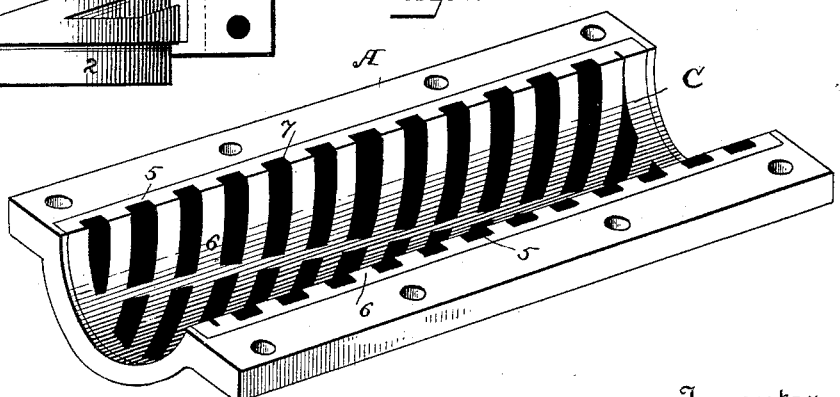
Witnesses.
Jno. G. Hinkel Jr.
N. G. Campbell.
Inventor.
Wm. W. Smalley,
By Foster & Freeman
Attorneys.

UNITED STATES PATENT OFFICE.

WILLIAM W. SMALLEY, OF BOUND BROOK, NEW JERSEY.

JOURNAL-BEARING.

SPECIFICATION forming part of Letters Patent No. 398,547, dated February 26, 1889.

Application filed May 12, 1888. Serial No. 273,720½. (No model.)

*To all whom it may concern:*

Be it known that I, WILLIAM W. SMALLEY, a citizen of the United States, residing in Bound Brook, in the county of Somerset, State of New Jersey, have invented certain new and useful Improvements in Journal-Bearings, of which the following is a specification.

My invention relates to that class of bearings in which graphite or plumbago is used as a substitute for oil as a lubricant; and my invention consists in the manufacture of a bearing, as fully set forth hereinafter, so as to reduce the cost and secure a more durable and permanent bearing-surface resulting in less friction than results from ordinary constructions.

In the drawings, Figure 1 is an end view of one section of a bearing-box, illustrating the mode of forming the lining. Fig. 2 is a plan of Fig. 1, the cap removed. Fig. 3 is a perspective view of the lined box-section partially supplied with graphite. Fig. 4 is an end view in part section, showing the feeding device.

Bearings for journals have heretofore been lubricated with pulverized graphite or plumbago; but the linings have been made of hard metal, or partly of hard metal and partly of soft metal. The use of hard metal in such connection modifies and impairs the efficiency of the plumbago as fine hard particles of grit such as find their way in abundance into the journal-boxes, especially car-boxes, are forced partly into the face of the hard-metal portion of the bearing, but cannot wholly penetrate the same, so that they project and act with a filing or rasping effect to reduce the surface of the journal and create friction that heats the journal and its bearing. To avoid these defects and secure fully the advantages resulting from the use of graphite as a lubricant, I make the lining wholly of soft metal in any suitable manner; but instead of producing a continuous soft-metal bearing-surface, as when Babbitt-metal linings are used in boxes, I form it with channels, pockets, or receptacles for graphite or graphite composition, as I will now describe.

The box A may be of any usual construction, such as those adapted to receive Babbitt-metal linings, but preferably constructed to admit of a thicker or heavier lining than is usually employed.

A mandrel, B, is prepared, the stem 2 thereof being equal in diameter to the diameter of the shaft or journal to be seated and with projections which in form are of the shape of the pockets to be produced. As shown, the projections are in the form of a continuous spiral rib and cross-ribs between the spirals.

The mandrel is usually divided longitudinally, and each half-section is arranged upon a plate, 3, and is placed axially in line within one section of the box, and Babbitt metal or other soft metal is poured in the space between the box and the mandrel and allowed to harden, after which the mandrel is removed, leaving the box-section with a channeled soft-metal lining, C, as shown in Fig. 3, the channels 5 being about equal in width to the intermediate flat-faced ridges 6. The channels are wholly or partially filled with graphite composition 7, and the two parts of the box are brought together and applied to the journal, and powdered graphite is fed to the bearing to completely fill the channels and any space that may exist between the journal and its bearing.

In a short time the graphite becomes distributed over the surface of the soft-metal ridges, so that the latter are soon coated with a hard fine film of graphite, which resists wear much better than the soft metal, takes a finer polish, affords less resistance to the movement of the journal, and results in less friction and heating. Should any fine hard grit find its way into the box, the particles will easily penetrate the soft metal and will be covered with plumbago, any injurious effects being thus prevented.

It has been found in practice that the flat soft-metal surfaces soon acquire a glaze of plumbago of considerable thickness, and that the same is harder and more durable than the soft-metal surface, that it is removed with difficulty, and reduces the friction to a minimum. This glazing of the metallic surface seems to result from a natural soldering together under pressure of the soft metal and plumbago, as the result does not ensue to such an extent where hard metal, wood, or other materials are employed. By forming the lining with pockets of soft metal I greatly facilitate the manufacture of the box, greatly reduce the cost, and secure the arrangement of bodies of graphite in proximity to soft-metal surfaces of slight extent, so that the graphite will be supplied with certainty and continuously to all parts thereof. By feeding the graphite in powder to the box I insure the application thereof to every part of the bearing and by its deposit thereon under pressure build up the bearing wherever it is not inclose contact with the journal, a result that never insues in an ordinary box.

The powdered graphite may be fed from a cup, D, in the same manner as oil; but the feeding-channel $x$ is preferably made larger, and it may extend longitudinally the length of the bearing, the cup being of a corresponding length.

While I have illustrated my invention in connection with a divided box, it may be used in connection with a continuous cylindrical bearing or hollow hub.

Without limiting myself to the precise construction and arrangement of parts shown, I claim—

A bearing for journals, consisting of a box, a soft-metal lining having flat-faced ridges substantially parallel with the surface of the journal, and with pockets or channels between the said ridges, and powdered graphite filling the said pockets, whereby it is adapted to fill inequalities in and coat or glaze the flat faces of the ridges, substantially as described.

In testimony whereof I have signed my name to this specification in the presence of two subscribing witnesses.

WILLIAM W. SMALLEY.

Witnesses:
I. N. BROKAW,
H. G. HERBERT.